United States Patent Office 3,477,804
Patented Nov. 11, 1969

3,477,804
TREATMENT OF WOOL
Arno Rudolph Friedl, Hordle, Lymington, England, assignor to The International Synthetic Rubber Company Limited, Southampton, Hampshire, England, a corporation of the United Kingdom
No Drawing. Filed Apr. 26, 1966, Ser. No. 545,300
Int. Cl. D06m 15/28
U.S. Cl. 8—128      14 Claims

ABSTRACT OF THE DISCLOSURE

A process for the treatment of wool to improve shrinking and felting characteristics comprising contacting the wool with a solution of a carboxylated rubbery polymer of a conjugated diene selected from the group consisting of butadiene, isoprene and dimethyl butadiene, to obtain a takeup not exceeding 5% of the weight of the dry wool, of carboxylated polymer, with the proviso that if less than 5% of the available double bonds of the polymer have been modified to give groupings containing carboxyl radicals, at least 0.1% by weight based on the weight of the polymer, of a dithiol is present in the solution.

---

This invention relates to the treatment of wool and, in particular, to the treatment of wool to improve its shrinkage and felting characteristics.

It has been proposed to use, in the treatment of wool, latices of modified and unmodified rubbers, but to obtain adequate shrinkage and felting protection high pickup levels, in excess of 5% by weight of the weight of wool, are necessary. Such high pickup levels result in loss of the characteristic handle of wool. The present invention is distinguished from these prior proposals by using a solution of a carboxylated rubbery polymer whereby a pickup of less than 5% is sufficient to give adequate shrinkage and felting protection to the wool.

The protection achieved by treatment of wool according to the present invention is permanent and is unaffected by continual extraction of the garments with dry-cleaning solvents.

According to the present invention, a method of treating wool to improve shrinkage and felting characteristics comprises contacting the wool with a solution of a carboxylated rubbery polymer (as hereinafter defined) of a conjugated diene to obtain a takeup, not exceeding 5% of the weight of the wool, of carboxylated polymer, with the proviso that if less than 5% of the available double bonds of the polymer have been modified to give groupings containing carboxyl radicals, at least 0.1% by weight, based on the weight of the polymers, of a dithiol is present in the solution. The words "carboxylated rubbery polymer" are used in this specification to denote a substance derived from a rubbery polymer having carbon-to-carbon double bonds in its molecule but having a minor proportion of those bonds modified by conversion into groupings containing carboxyl radicals. Preferably the proportion of the double bonds so modified is within the range 1% to 20%.

Conveniently the carboxylated rubbery polymer used is one derived from a homopolymer of a conjugated diene, e.g., butadiene, isoprene or dimethylbutadiene, or from a copolymer (which includes interpolymers) of at least 50% of a conjugated diene and a monoene, e.g., styrene, vinyl toluene or divinylbenzene. Carboxylated rubbery polymers derived from polybutadienes and butadiene-styrene copolymers have been found particularly satisfactory in practice and are relatively inexpensive.

The conversion of the plain rubbery polymer into the carboxylated rubbery polymer may suitably be effected by treating the plain rubbery polymer with thioglycollic acid, i.e., $HSCH_2COOH$, or another thiolcarboxylic acid.

Polymers in which less than 5% of the available double bonds have been modified to give groupings containing carboxyl radicals are used in conjunction with a dithiol, e.g., ethylene glycol dimercaptoacetate, $$HSCH_2COOCH_2CH_2OOCCH_2SH$$

or other dithiols, such as 1,6-hexanediol bis-thioglycollate. The addition of between 0.1 and 5% of dithiol by weight (referred to the weight of polymer) in the impregnation solution gives improved antifelting and shrinkage performance.

Polymers in which more than 5% of the available double bonds have been modified to give groupings containing carboxyl radicals may give better shrinkage and antifelting protection in the absence of dithiol than the under-5% modified rubbers even when the latter are used in conjunction with a dithiol. To obtain the highest degree of protection, however, a dithiol should be present even with over-5% modified rubbery polymers.

The solution of the carboxylated rubbery polymer, i.e. the liquid with which the wool is brought into contact, is preferably a solution of the carboxylated rubbery polymer in an organic solvent, e.g., toluene, benzene, perchloroethylene ($C_2Cl_4$), white spirit, or the like. The solution may be relatively dilute, e.g. may contain only 0.5% to 5% by weight of the carboxylated rubbery polymer and it may suitably be used at room temperature and in a single impregnation step. The impregnation may be carried out by a single-stage process by immersing the wool in the solution, excess solvent being removed by passing between squeeze rollers or centrifuging, for instance. The duration of the contact of the wool and the liquid may be very short, i.e. merely a matter of seconds, durations of contact within the range of 3 to 120 seconds being generally sufficient. Normally no heat treatment is needed if a dithiol is present, though a short heat treatment, e.g., 5 minutes at 100° C., may be carried out if desired to improve the retention of the carboxylated rubbery polymer by the wool in the presence of dry-cleaning solvents or other organic solvents. If no dithol is present, however, it is generally inadvisable to omit heat treatment if the greatest possible improvements in respect of shrinkage and felting characteristics are to be secured.

The weight of carboxylated rubbery polymer taken up by the wool in accordance with the present invention is, as already specified, quite small, i.e., under 5% referred to the weight of the wool. In practice, very good results are obtained when a weight of carboxylated polymer which is 0.5/ to 2.5% of the weight of the wool is taken up. The use of these low quantities of rubbery polymer ensures virtually no change in handle of the wool. Proprietary softening agents may be used if required but have generally been found to be unnecessary. The wool is normally treated when in the form of a woven or knitted or other fabric, but the treatment may also if desired be carried out on wool in yarn form or other nonfabricated form. The nonfabricated forms which may be treated include (besides yarns) rovings, slivers, unprepared fibres, felts and the like. The wool may be in dyed or undyed form; it may be in pure form (i.e., 100% wool) or in the form of a blend with other textile fibres, which may be natural and/or artificial; and it may be in chemically unmodified form or in reduced form. The reduced form of wool just referred to is that in which disulphide bonds in the wool molecules have been broken to give thiol groups, and it is believed that this will increase the number of sites in the wool molecules at which chemical modification may be effected. Wool may be converted into the reduced form by means of such reducing agents as sulphites and bisulphites, thioglycollic acid and the like.

The treatment of wool in accordance with the present invention makes available to product showing valuable improvements in respect of shrinkage-resistance and resistance to felting, when the wool is washed with ordinary soap solutions or other orthodox detergent solutions. Very valuable improvements are also obtainable in respect of resistance to attack by acids and alkalis and in respect of resistance to creasing.

Although it is not my intention to bind myself by any theoretical explanation of these improvements, I believe that the present treatment may result in the chemical modification of the wool at some of the sites in the wool fibre molecules at which there are reactive hydrogen atoms, e.g., reactive hydrogen atoms forming parts of amino, imino, guanidino, aliphatic hydroxyl and phenolic hydroxyl and sulphydryl (i.e., mercapto or thiol) groups. The incorporation of dithiol makes possible a significant improvement in the resistance to shrinkage and felting of the under-5% modified carboxylated rubbery polymers. A chemical reaction probably takes place between the modified polymers, the dithiol and the wool molecule.

The following examples illustrate the invention.

The shrinkage figures are relaxation shrinkage plus shrinkage due to felting. The following standard shrinkage test was carried out.

Fabrics were washed for one hour in an English Electric Liberator washing machine (model No. 4021) at pH 7 in a phosphate buffer solution. The temperature of washing was 40° C. and a fabric to liquor ratio of 1:20 was used. The use of a phosphate buffer solution has given slightly more consistent shrinkage figures than when using conventional soap solutions.

EXAMPLE I

Carboxylated polybutadiene was prepared by the reaction between polybutadiene and thioglycollic acid to give modification of 5% of the double bonds available. Samples of wool fabric were immersed for 60 secs. in a 1% toluene solution of the above modified polymer. The fabrics were passed through squeeze rollers to remove excess liquid and allowed to dry in air. The fabrics were found to have taken up 1.5% of polymer. A shrinkage of 7% was measured on the fabric after machine washing compared with 63% for an untreated control fabric. The appearance of the treated wool fabric after washing was as new.

EXAMPLE II 2 parts of ethylene glycol dimercaptoacetate per 100 parts of polymer were added to the modified polymer solution described in Example I. The mixture was stirred at room temperature for 1 min. Samples of wool fabric were immersed for 1 min. in the 1% solution. The fabrics were passed through squeeze rollers to remove excess liquid and allowed to dry in air. The fabrics were found to have taken up 1.5% of polymer. A shrinkage of 4% was measured after machine washing.

EXAMPLE III

A fabric treated as described in Example II was allowed to dry in air and extracted with perchloroethylene at 50° C. for 24 hours. Half of the modified polymer remained attached to the wool fabric, i.e. 0.75% referred to the weight of the wool. A 4% shrinkage was again measured on the fabric after machine washing.

EXAMPLE IV

A fabric treated as described in Example II was heated for 15 min. at 90° C. A 2% shrinkage was measured on the fabric after machine washing. A similar fabric was heated for 15 min. at 80° C., and then extracted with perchloroethylene at 50° C. for 24 hours. Three quarters of the polymer (1.125% referred to the weight of the wool) remained attached to the fabric. A 2% shrinkage was measured on the extracted fabric after hand-milling.

EXAMPLE V

Carboxylated polybutadiene was prepared to give modification of 3.0% of the available double bonds. Samples of wool fabric were immersed in a 1.0% solution of the modified polymer in perchloroethylene long enough to enable 2.5% of solids (referred to the weight of fabric) to be picked up. The fabric was allowed to dry in air and finally heated for 15 minutes. A 90° C. shrinkage of 6% was measured after machine washing.

EXAMPLE VI 2 parts of ethylene glycol di-mercaptoacetate per 100 parts of polymer were added to a 1.0% solution of the modified polymer of Example V in perchloroethylene. Samples of wool fabric were immerced in a dilute solution long enough to allow 1.5% of solids (referred to the weight of fabric) to be picked up.

The fabrics were heated for 15 minutes at 90° C. A 3% shrinkage was measured after machine washing. An untreated control fabric gave a shrinkage figure of 68%.

EXAMPLE VII

Hanks of wool yarns were immersed in a 1.8% solution of perchloroethylene/trichloroethylene (75/25 wt./wt.) containing 2% 1,6-hexanediol bisthioglycollate for two minutes passed between squeeze rollers and dried at 90° C. for 15 minutes. A solids pickup of 2.5% was measured on the weight of the wool.

Fabrics were knitted up from the treated yarns and found to be completely resistant to shrinkage and felting. A shrinkage of 2% was measured after machine washing. The appearance of the fabrics was as new. An untreated control fabric gave a shrinkage of 57% when washed under the same conditions.

What I claim is:

1. A process for the treatment of wool to improve shrinking and felting characteristics comprising contacting the wool with a solution of a carboxylated rubbery polymer of a conjugated diene selected from the group consisting of butadiene, isoprene and dimethyl butadiene, to obtain a take up not exceeding 5% of the weight of the dry wool, of carboxylated polymer, with the proviso that if less than 5% of the available double bonds of the polymer have been modified to give groupings containing carboxyl radicals, at least 0.1% by weight based on the weight of the polymer, of dithiol is present in the solution.

2. A process according to claim 1 in which from 1–20% of the double bonds of the rubbery polymer of said conjugated diene are modified by conversion into groupings containing carboxyl radicals.

3. A process according to claim 1 in which the carboxylated rubbery polymer is used in solution in an organic solvent selected from the group consisting of toluene, benzene, perchloroethylene and white spirit.

4. A process according to claim 1 in which from 0.1 to 5% of a dithiol selected from the group consisting of ethylene glycol dimercaptoacetate and 1,6-hexanediol bisthioglycollate is present in the impregnation solution.

5. The process of claim 1 wherein said rubbery polymer has a minor proportion of its double bonds modified by the addition of carboxyl groups, and wherein subsequent to said contacting step, the solvent is removed.

6. The process of claim 1 wherein said rubbery polymer is a homopolymer of said conjugated diene.

7. The process of claim 1 wherein said rubbery polymer is a polymer of said conjugated diene and a vinyl monomer selected from the group consisting of styrene, vinyl toluene, and divinylbenzene.

8. The process of claim 3 wherein the concentration of said rubbery polymer in said organic solvent is from 0.5% to 5% by weight.

9. A process for the treatment of wool to improve shrinking and felting characteristics comprising contacting the wool with a solution of a carboxylated rubbery polymer of a conjugated diene selected from the group consisting of polymers of at least 50% of a conjugated diene with an ethylenically unsaturated monomer selected from the group consisting of styrene, vinyl toluene and divinylbenzene to obtain a take up, not exceeding 5% of the weight of the dry wool, of carboxylated polymer, with the proviso that if less than 5% of the available double bonds of the polymer have been modified to give groupings containing carboxyl radicals, at least 0.1% by weight based on the weight of the polymer, of a dithiol is present in the solution, followed by removal of the solvent.

10. A process according to claim 9 in which from 1-20% of the double bonds of the polymer of the conjugated diene are modified by conversion into groupings containing carboxyl radicals.

11. A process according to claim 9 in which the carboxylated rubbery polymer is used in solution in an organic solvent selected from the group consisting of toluene, benzene, perchloroethylene and white spirit and which solution contains from 0.5 to 5% by weight of the carboxylated rubbery polymer.

12. A process according to claim 9 in which from 0.1 to 5% of a dithiol selected from the group consisting of ethylene glycol dimercaptoacetate and 1,6-hexanediol bis-thioglycollate is present in the impregnation solution.

13. The treatment of wool to improve shrinking and felting characteristics comprising depositing thereon up to 5% based on the dry weight of wool, of a modified rubbery polymer of a conjugated diene by immersing the wool in a solution of said polymer in an organic solvent, followed by removal of the solvent, said polymer having from 5% to 20% of its carbon to carbon double bonds modified by addition of carboxyl groups.

14. The treatment of wool to improve shrinking and felting characteristics comprising depositing thereon up to 5% based on the dry weight of wool, of a modified rubbery polymer of a conjugated diene by immersing the wool in a solution including said polymer in an organic solvent and from 0.1 to 5% by weight based on the weight of said polymer, of a dithiol, said polymer having from 1% to 5% of its carbon to carbon double bonds modified by addition of carboxyl groups, followed by removal of the solvent.

References Cited
UNITED STATES PATENTS 2,499,653   3/1950   Kropa et al. _____ 8—128 X RICHARD D. LOVERING, Primary Examiner U.S. Cl. X.R.

8—112; 117—139.4